US00RE46045E

(19) United States
(12) Reissued Patent
Qiu et al.

(10) Patent Number: US RE46,045 E
(45) Date of Reissued Patent: Jun. 28, 2016

(54) HYSTERETIC CONTROLLED BUCK-BOOST CONVERTER

(71) Applicant: INTERSIL AMERICAS LLC, Milpitas, CA (US)

(72) Inventors: Weihong Qiu, San Ramon, CA (US); Zaki Moussaoui, San Carlos, CA (US); Jun Liu, San Jose, CA (US)

(73) Assignee: Intersil Americas LLC, Milpitas, CA (US)

(21) Appl. No.: 14/301,169

(22) Filed: Jun. 10, 2014

Related U.S. Patent Documents

Reissue of:
(64) Patent No.: 8,330,435
Issued: Dec. 11, 2012
Appl. No.: 12/903,683
Filed: Oct. 13, 2010

U.S. Applications:
(60) Provisional application No. 61/252,054, filed on Oct. 15, 2009.

(51) Int. Cl.
*G05F 1/613* (2006.01)

(52) U.S. Cl.
CPC ..... *G05F 1/613* (2013.01)

(58) Field of Classification Search
CPC ..... G05F 1/613; G05F 1/24; G05F 1/563; H02M 3/156
USPC ..... 323/222, 224, 225, 290, 285
See application file for complete search history.

(56) References Cited

U.S. PATENT DOCUMENTS

| | | | | |
|---|---|---|---|---|
| 4,929,882 | A | 5/1990 | Szepesi | |
| 5,602,463 | A | 2/1997 | Bendall et al. | |
| 6,166,527 | A | 12/2000 | Dwelley et al. | |
| 7,391,190 | B1 * | 6/2008 | Rajagopalan | 323/225 |
| 7,843,177 | B2 * | 11/2010 | Ho et al. | 323/222 |
| 2003/0222629 | A1 | 12/2003 | Inoue et al. | |
| 2008/0067993 | A1 | 3/2008 | Coleman | |

FOREIGN PATENT DOCUMENTS

| | | |
|---|---|---|
| CN | 1637677 | 7/2005 |
| CN | 101123395 | 2/2008 |
| CN | 101167239 | 4/2008 |
| CN | 101212173 | 7/2008 |
| CN | 101499717 | 8/2009 |
| TW | 591866 | 6/2004 |

* cited by examiner

*Primary Examiner* — My-Trang Ton
(74) *Attorney, Agent, or Firm* — Fogg & Powers LLC

(57) ABSTRACT

An apparatus includes a buck boost converter for generating a regulated output voltage responsive to an input voltage. The buck boost converter includes an inductor, a first pair of switching transistors responsive to a first PWM signal and a second pair of switching transistors responsive to a second PWM signal. An error amplifier generates an error voltage responsive to the regulated output voltage and a reference voltage. A control circuit generates the first PWM signal and the second PWM signal responsive to the error voltage and a sensed current voltage responsive to a sensed current through the inductor. The control circuit controls switching of the first pair of switching transistors and the second pair of switching transistors using the first PWM signal and the second PWM signal responsive to the sensed current through the inductor and a plurality of offset error voltages based on the error voltage.

28 Claims, 6 Drawing Sheets

HYSTERETIC CONTROLLED BUCK-BOOST CONVERTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue of U.S. application Ser. No. 12/903,683, filed on Oct. 13, 2010, which* claims *the* benefit *of priority* of U.S. Provisional Application No. 61/252,054, titled HYSTERETIC CONTROLLED BUCK-BOOST CONVERTER, filed Oct. 15, 2009, *both of* which [is] *are* incorporated herein by reference.

BRIEF DESCRIPTION OF THE DRAWINGS

For a more complete understanding, reference is now made to the following description taken in conjunction with the accompanying Drawings in which.

DETAILED DESCRIPTION

Figure 1:
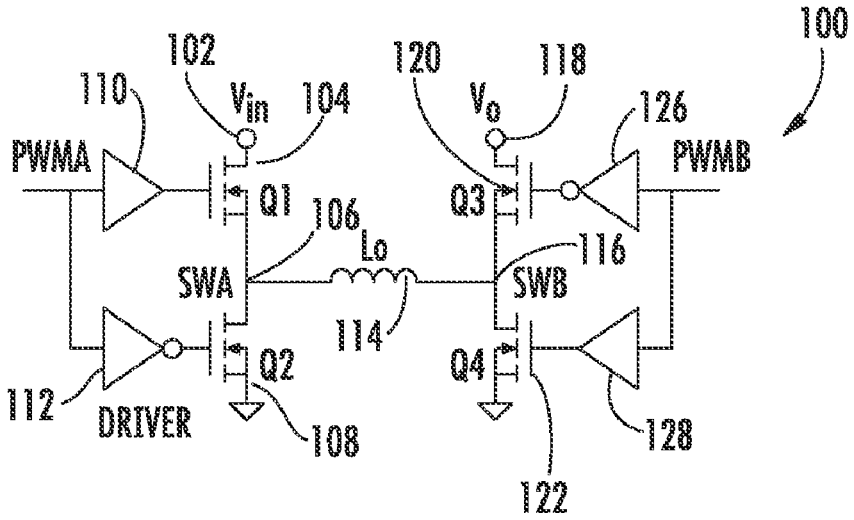
FIG. 1 is a schematic diagram of a buck-boost converter.

Referring now to the drawings, wherein like reference numbers are used herein to designate like elements throughout, the various views and embodiments of a hysteretic controlled buck-boost converter are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

For DC/DC converters with a wide input voltage range, several topologies are available such as the cascaded boost-buck, 4-switch buck-boost, SEPIC and Cuk converters. Compared to other single-switch topologies, the classic 4-switch buck converter, also referred to as a single inductor or non-inverting buck-boost converter, achieves better performance at the cost of increased switching components. These types of converters have become popular in many applications such as portable electronic devices.

Typically, a buck-boost converter runs in three different operational modes based upon the relationship between the input voltage and the output voltage. These include the buck mode of operation, the boost mode of operation and the buck-boost mode of operation. The key challenge is to achieve a smooth transition between each of these modes of operation. A number of schemes exist to achieve mode transitions between these modes of operation. Most of these schemes enable the switch to run at the nominal switching frequency in the buck-boost mode, while only two switches are utilized in either the buck mode or the boost mode. This configuration increases the switching losses in the buck-boost mode of operation.

Referring now to the drawings, and more particularly to FIG. 1, there is illustrated a schematic diagram of a 4-switch buck-boost converter 100. The buck-boost converter 100 includes an input voltage node 102 to which the input voltage $V_{IN}$ is applied. A first switching transistor Q1 104 has its drain/source path connected between node 102 and the SWA node 106. A second switching transistor 108 has its drain/source path connected between node 106 and ground. A driver 110 is connected to the gate of transistor 104 and is connected to receive a first PWM control signal PWMA. A second inverting driver 112 is connected to the gate of transistor 108 and is also connected to receive the PWMA control signal. Inductor 114 is connected between SWA node 106 and SWB node 116. The output voltage $V_{OUT}$ is provided at node 118. A transistor 120 has its drain/source path connected between node 118 and the SWB node 116. A transistor 122 has its drain/source path connected between node 116 and ground. Inverting driver 126 is connected to the gate of transistor 120. The driver 126 receives the PWMB control signal at its input. The PWMB control signal is also provided to the input of the driver 128 whose output is connected to the gate of transistor 122.

The buck-boost converter 100 operates in either the buck mode of operation, the boost mode of operation or the buck-boost mode of operation in order to regulate the output voltage $V_{OUT}$. The output voltage $V_{OUT}$ may be greater than, less than or equal to the input voltage of $V_{IN}$. In order to reduce switching losses, only two switches of the four switches described with respect to FIG. 1 are operating when the input voltage is substantially different from the output voltage. When the input voltage $V_{IN}$ is above the output voltage $V_O$, transistor 120 is turned on, transistor 122 is turned off and transistors 104 and 108 are switched in a similar manner to that of a buck DC/DC converter. When the input voltage $V_{IN}$ is below the output voltage $V_O$, transistor 104 is turned on, transistor 108 is turned off and transistors 120 and 122 are switched as is done in the operation of a conventional boost converter. When the input voltage is substantially equal to the output voltage, e.g., when $V_{IN}$ and $V_{OUT}$ are 46 volts and 48 volts, respectively, the switches in the conventional 4-switch buck-boost converter are turned on and off once each cycle. This results in significantly higher switching losses than occur in either the buck or boost modes of operation.

The 4-switch buck-boost converter 100 includes 5 different operational modes. In the charging mode, when the PWMA signal is at a logical "1" level and the PWMB signal is at a logical "1" level, the SWA node 106 is coupled to the input voltage $V_{IN}$ and the SWB node 116 is coupled to ground. This causes the inductor current through inductor 114 to increase.

In the discharge mode of operation when each of the PWMA signal and the PWMB signal are at logical "0" level, the SWA node 106 is coupled to ground while the SWB node 116 is coupled to the output voltage $V_{OUT}$. Thus, the inductor current continues to increase in this mode of operation.

In the direct pass mode of operation, when the PWMA signal is at a logical "1" level and the PWMB is at a logical "0" level, the SWA node 106 is coupled to the input voltage $V_{IN}$ and the SWB node 116 is coupled to the output voltage $V_{OUT}$. Thus, the inductor current increases when the input voltage is greater than the output voltage or decreases when the input voltage is less than the output voltage.

In the free-wheeling mode of operation, when the PWMA signal is at a logical "0" level and the PWMB is at a logical "1" level, the SWA node 106 and the SWB node 116 are each coupled to ground. The inductor current will thus change only by a small amount in this state. Finally, in the off mode of operation when each of the PWMA and PWMB signals are disabled, all switching transistors are turned off for diode emulation or discontinuous conduction mode of operation when the inductor current drops to zero.

When the input voltage is substantially different from the output voltage, only two switches of the 4-switch buck-boost converter will operate. Thus, the buck-boost converter will switch between charging and direct pass modes or between discharging and direct pass modes. In accordance with one embodiment of the present disclosure, a buck-boost converter uses a hysteretic comparator as will be more fully described herein below among other things to determine the mode of operation when the input voltage is substantially close to the output voltage.

Figure 2:
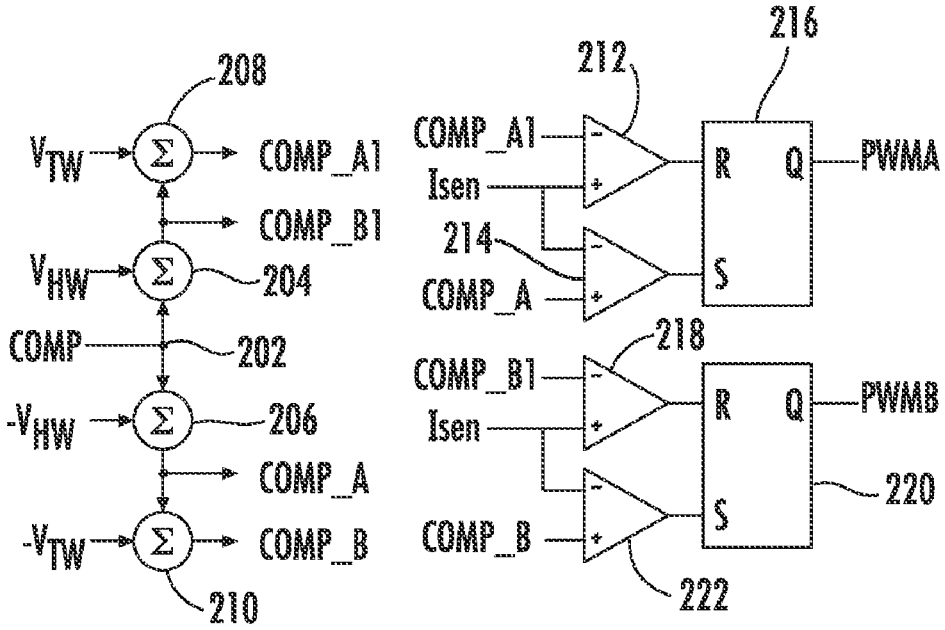
FIG. 2 illustrates a control circuit for generating the PWM control signals to the circuit of FIG. 1.

Referring now to FIG. 2, there is illustrated one implementation of a control circuit utilizing a hysteretic converter in order to generate the PWMA and PWMB control signals for controlling the switching transistors of the buck-boost converter 100 of FIG. 1. The control circuit 200 of FIG. 2 implements a two threshold hysteretic comparator that sense the output current of the buck-boost converter 100 through the inductor 114 in order to determine the operational mode of the converter. The buck-boost converter 100 is adapted to have a switching frequency based upon an input voltage resulting in a lower switching frequency while operating in the buck-boost mode of operation. This achieves a higher overall efficiency.

The control circuit converter of FIG. 2 includes a first input for receiving the output COMP of an error amplifier at node 202. The error amplifier signal COMP is applied to a first summation circuit 204 wherein the error amplifier signal is added to the offset voltage $V_{HW}$ to generate the COMP_B1 offset voltage signal. The error amplifier signal is also applied to summation circuit 206. Summation circuit 206 adds the error amplifier signal with the offset voltage $-V_{HW}$ to generate the signal offset voltage COMP_A. The COMP_B1 offset voltage signal is applied to summation circuit 208 as is the offset $V_{TW}$. The summation circuit 208 adds these values and generates the signal offset voltage COMP_A1. The COMP_A offset voltage signal is applied to summation circuit 210 along with the offset $-V_{TW}$ to generate the signal offset voltage COMP_B.

The COMP_A1 offset voltage signal is applied to an inverting input of a comparator 212. The non-inverting input of comparator 212 is connected to receive a voltage representation (ISEN) of the inductor current ISEN through the inductor 114. A second comparator 214 is connected to receive the COMP_A offset voltage signal at its non-inverting input and the ISEN signal at its inverting input. The output of comparator 212 is applied to the R input of an SR latch 216. The output of comparator 214 is connected to the S input of the SR latch 216. The Q output of the SR latch 216 provides the PWMA offset voltage signal.

The COMP_B1 offset voltage signal from summation circuit 204 is applied to the inverting input of a comparator 218. The non-inverting input of comparator 218 is connected to receive the ISEN signal. The output of comparator 218 is connected to the R input of an SR latch 220. The S input of the SR latch 220 is connected to a comparator 222. The inverting input of the comparator 222 is connected to the ISEN signal while the non-inverting input is connected to receive the COMP_B offset voltage signal from summation circuit 210. The output of the SR latch 220 generates the PWMB signal.

The hysteretic converter, as illustrated in FIG. 2, provides two window voltages (COMP_B to COMP_B1; COMP_A to COMP_A1,) which are generated based upon the output COMP of the error amplifier. The sensed inductor current is converted to a voltage value ISEN and compared to the window voltage COMP_A and COMP_A1 in order to generate the PWMA signal applied to the transistors 104 and 108 of FIG. 1. Similarly, the PWMB signal for transistors 120 and 122 are generated by comparing the sensed inductor current signal converted to a voltage ISEN to the window voltage COMP_B and COMP_B1.

The offset voltage $V_{HW}$ defines the hysteretic window voltage for the inductor current ripple. The offset voltage $V_{TW}$ is selected to have a relatively small value. In one example, COMP is two volts, $V_{HW}$ is 2.2 volts and $V_{TW}$ is 2.3 volts.

The circuit of FIG. 2 illustrates a two threshold hysteretic comparator that senses the output current of the buck-boost converter to determine the operational mode of the converter. The converter is thus adapted to have a switching frequency based upon its input voltage resulting in a lower switching frequency while operating in a buck-boost mode and achieving higher efficiencies. In some applications, it is not necessary to maintain a constant switching frequency. To improve the operating efficiency of the buck-boost converter 100 the switching frequency must be kept as low as possible. When the input voltage is substantially close to the output voltage, i.e., the buck-boost mode of operation, the inductor current changes by a small amount in the direct pass mode with both the input voltage and the output voltage applied to the inductor. Thus, it is possible to stay within the direct pass mode for a long period of time. The implementation illustrated in FIG. 2 sets up the window for the inductor current ripple based upon the output voltage ripple requirement and thus dispensing the need for a switching operation as long as the inductor ripple current stays within the desired window. This results in a lower switching frequency. The hysteretic converter operates according to the following protocol in order to keep the inductor current within a desired hysteretic window defined according to the system parameters, like inductor current ripple.

When the inductor current is above the desired upper window (COMP_B1), the converter switches to the direct pass mode of operation. If the inductor current does not drop, the converter switches to the discharge mode of operation to pull down the inductor current.

When the inductor current is below the desired lower window (COMP_A), the converter switches to the direct pass mode of operation. If the inductor current does not increase, the converter switches to the charging mode of operation to increase the inductor current.

When the error amplifier output voltage drops to a lower saturated status, the converter temporarily enters the free-wheeling mode of operation to reduce the output overshoot voltage during the load release. The converter will return to the direct pass mode of operation when the error amplifier exits its saturation status. Finally, for the diode emulation mode of operation, all of the switches are turned off when the inductor current drops to zero.

Figure 3:
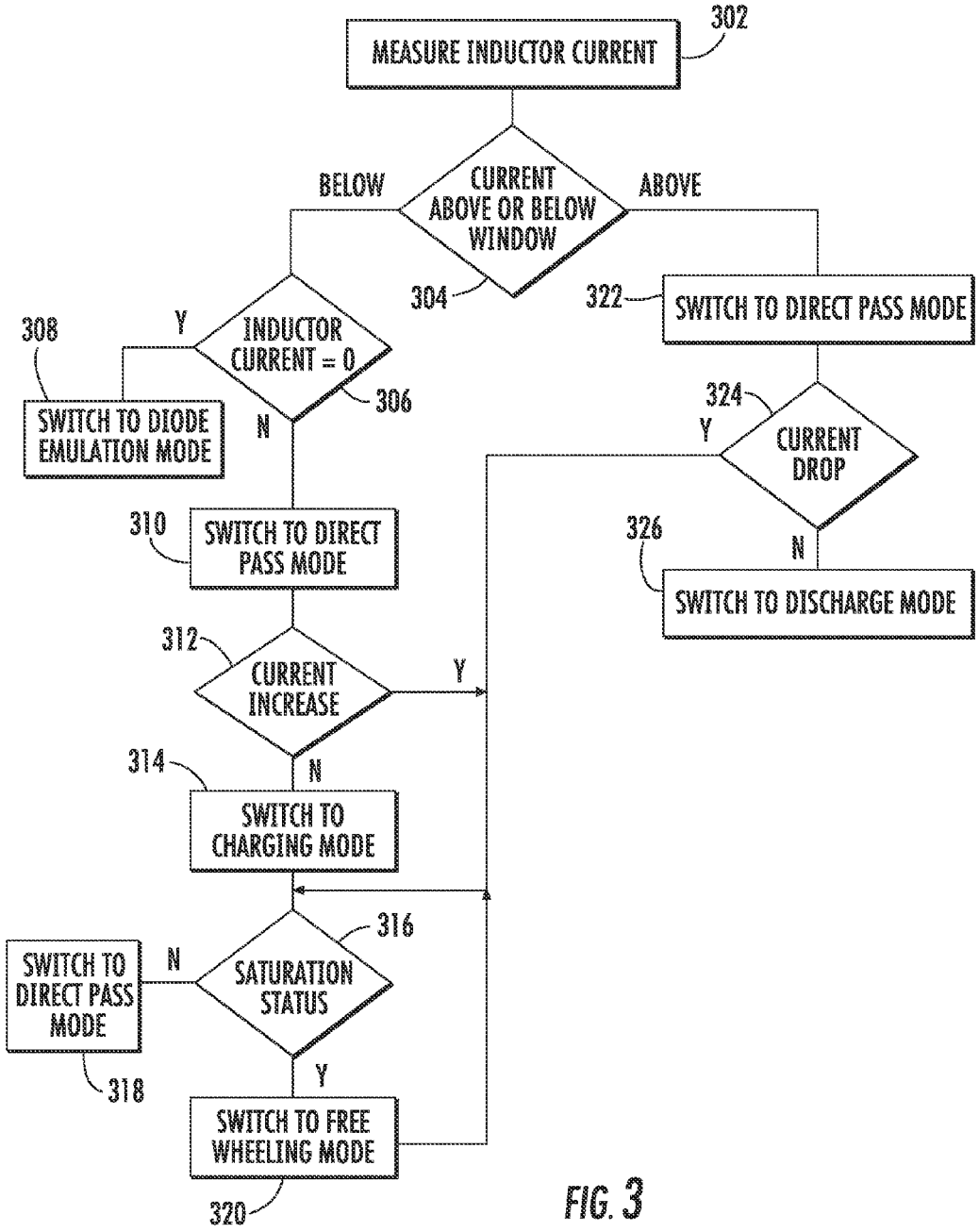
FIG. 3 illustrates is a flow diagram illustrating the operation of the hysteretic control circuitry.

Referring now to FIG. 3, there is illustrated a flow diagram describing the operation of the above described protocol within the hysteretic converter. The inductor current is measured at step 302 and inquiry step 304 determines whether the inductor current is above or below the defined hysteretic window. If below the desired window, inquiry step 306 determines whether the inductor current is presently zero. If the inductor current is presently zero, the converter is switched to the diode emulation mode at step 308. If the inductor current is not zero, the converter is switched to the direct pass mode of operation at step 310.

Inquiry step 312 determines whether the inductor current increase is responsive to switching to the direct pass mode of operation. If not, the converter switches at step 314 to the charging mode of operation. If the inquiry step 312 determines that the current has increased or once the converter has switched to the charging mode of operation inquiry step 316 determines whether the output voltage has dropped to its lower saturated status. If not, control passes to the direct pass mode of operation at step 318. If the voltage does drop to the lower saturated status, the voltage converter switches to the free-wheeling mode of operation at step 320.

If inquiry step 304 determines that the current is above the desired hysteretic window, it switches to the direct pass mode of operation at step 322. Inquiry step 324 determines whether a current drop has occurred responsive to switching to the direct pass mode of operation and if not, the converter switches to the discharge mode of operation at step 326. If there is a current drop determined at inquiry step 324, control passes to inquiry step 316 to monitor for the output voltage dropping to its lower saturation status.

Figure 4:
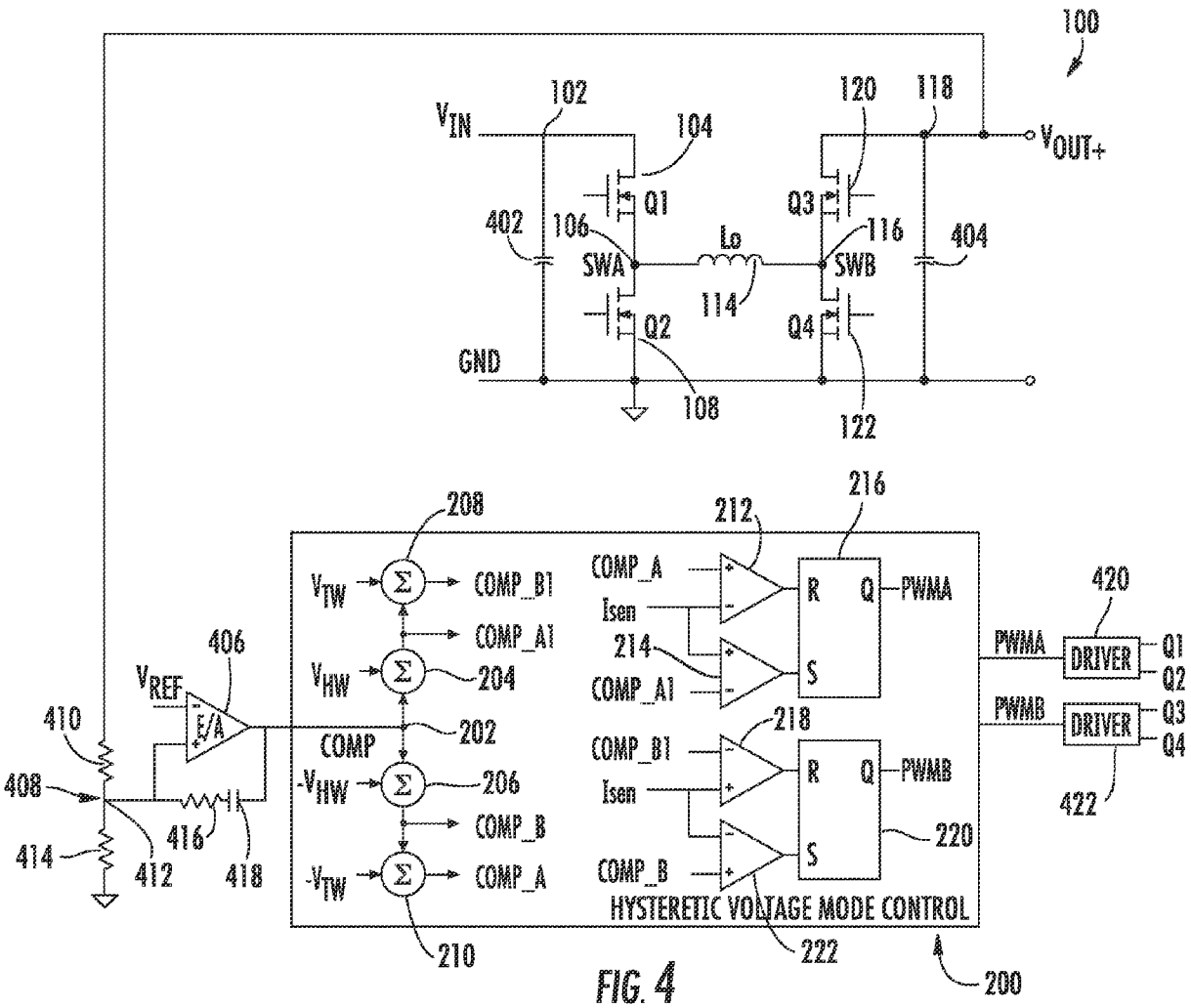
FIG. 4 illustrates a detailed schematic diagram of a buck-boost converter including hysteretic voltage mode control circuitry.

Referring now to FIG. 4, there is illustrated a schematic diagram of a buck-boost converter 100 whose operation is controlled by a control circuit including hysteretic voltage mode control as described with respect to FIG. 2. The buck-boost converter 100 has the input voltage applied at its input voltage node $V_{IN}$ 102. The transistor 104 has its drain/source path connected between node 102 and the SWA node 106. Transistor 108 has its drain/source path connected between node 106 and ground. Inductor 114 is connected between SWA node 106 and SWB node 116. Transistor 120 has its drain/source path connected between the output voltage node 118 and the SWB node 116. Transistor 122 has its drain/source path connected between the SWB node 116 and ground. A capacitance 402 is connected between node 102 and ground and an output capacitance 404 is connected between node 118 and ground.

The output voltage is monitored at node 118 by an error amplifier 406 connected to a voltage divider network 408. The voltage divider network 408 consists of a resistor 410 connected between node 118 and node 412. [Capacitor] *Resistor* 414 is connected between node 412 and ground. The [inverting] *non-inverting* input of error amplifier 406 monitors the output voltage at node 412. The [non-inverting] *inverting* input of the error amplifier 406 is connected to receive a reference voltage $V_{REF}$. A capacitor 418 in series with a resistor 416 is connected between the output of the error amplifier 406 and its [inverting] *non-inverting* input. The output COMP of the error amplifier 406 is applies to node 202 of the hysteretic voltage mode control circuit 200 described previously with respect to FIG. 2. The output PWMA from SR latch 216 is provided to a driver circuit 420 that provides drive signals to transistors 104 and 108, respectively. The PWMB control signal from SR latch 220 is provided to driver 422 for generating the drive signals for transistors 120 and 122, respectively.

Based upon the input voltage $V_{IN}$ and the output voltage $V_{OUT}$, the buck-boost converter includes three operational modes, namely the buck mode of operation, boost mode of operation and buck-boost mode of operation. According to the present disclosure, the operational mode of the buck-boost converter is made without sensing the input voltage so that the transitions between the modes occur naturally and smoothly. The switching frequency is defined by the inductor current ripple and window voltage $V_{HW}$. Thus, the switching frequency is automatically reduced when the input voltage is close to the output voltage especially in the buck-boost mode of operation. This will greatly reduce the switching losses within the buck-boost converter.

Figure 5:
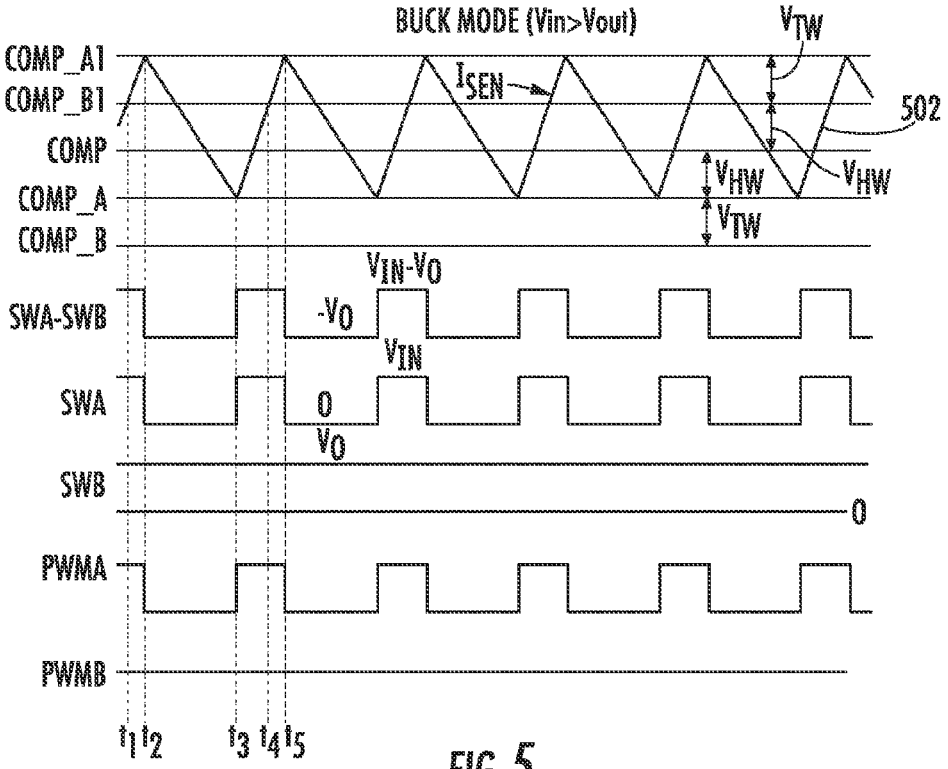
FIG. 5 is a timing diagram illustrating the operation of the buck-boost converter in the buck mode of operation.

Referring now to FIG. 5, there is illustrated the operation of the buck-boost converter within the buck mode of operation. Within the buck mode of operation, transistor 120 remains "on" while transistor 122 remains "off" to couple the SWB node 116 to the output voltage node 118. Switching transistors 104 and 108 are switched "on" and "off" to alternately couple the SWA node 106 between the input voltage and ground. Prior to time $T_1$, the buck-boost converter 100 runs in the direct pass mode of operation with the PWMA control signal at a logical "high" level and the PWMB signal at a logical "low" level. The input voltage and the output voltage are each applied to the inductor 114. Since the input voltage is higher than the output voltage, the inductor current will begin to increase.

At time $T_1$, the sensed inductor current $I_{SEN}$ 502 reaches the first upper window voltage COMP_B1 which triggers the direct pass mode of operation. The buck-boost converter 100 is already within the direct pass mode of operation so, no switching operation occurs and the inductor current $I_{SEN}$ will continue increasing. At time $T_2$, the $I_{SEN}$ inductor current signal reaches the second upper window voltage COMP_A1. This will cause the buck-boost converter 100 to enter the discharge mode of operation wherein each of the PWMA control signal and the PWMB control signal are at a logical "low" level. This causes transistor 104 to be turned "off" and transistor 108 to be turned "on." The voltage across the inductor is at the output voltage so that the inductor current begins to decrease from time $T_2$ to time $T_3$.

At time $T_3$ the sensed inductor current $I_{SEN}$ drops below the first lower window voltage COMP_A causing the PWMA signal to rise to a logical "1" level and the buck-boost converter to enter the direct pass mode of operation wherein the PWMA signal is at a logical "high" level and the PWMB signal is at a logical "low" level. Within the direct pass mode of operation transistor 108 is turned "off" while transistor 104 is turned "on." The above described operation will then repeat since the sensed inductor current $I_{SEN}$ will begin increasing from time $T_3$ to time $T_4$ and $T_5$, respectively. The sensed inductor current is controlled within the window voltages COMP_A and COMP_A1.

Figure 6:
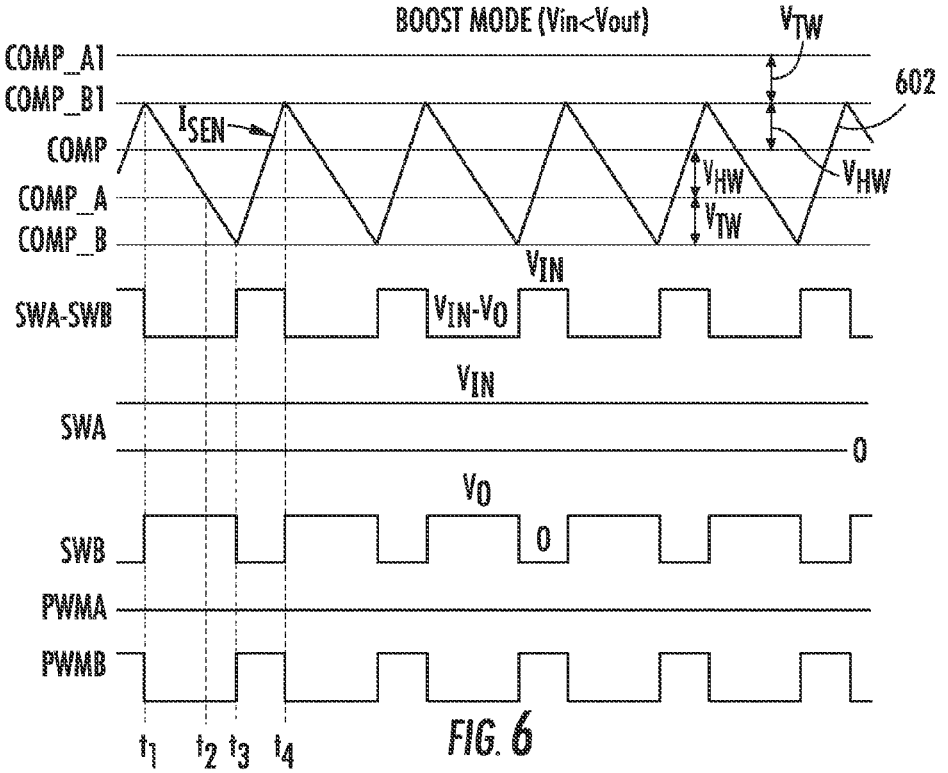
FIG. 6 is a timing diagram illustrating the operation of the buck-boost converter in boost mode of operation.

Referring now to FIG. 6, there is illustrated the operation of the buck-boost converter in the boost mode of operation wherein the input voltage is less than the output voltage. Within the boost mode of operation, switching transistor 104 remains turned "on" while switching transistor 108 remains turned "off" to couple node SWA 106 to the input voltage. Switching transistors 120 and 122 are alternately turned "on" and "off" to switch the SWB node 116 between the output voltage and ground as described herein below. Prior to time $T_1$, the buck-boost converter 100 runs in the charging mode with PWMA and PWMB both at a logical "high" level. During this charging mode, the input voltage is applied to the inductor 114 and the inductor current represented by the ISEN signal 602 increases. At time $T_1$, the sensed inductor current ISEN 602 reaches the first upper window voltage COMP_B1 and the PWMB signal is pulled to a logical "low" level. This will switch the buck-boost converter from the charging mode to the direct pass mode where PWMA is at a logical "high" level and PWMB is at a logical "low" level. This causes transistor 122 to be turned "off" while transistor 120 is turned "on".

The voltage across the output inductor equals $V_{IN}-V_{OUT}$. Since the input voltage is lower than the output voltage, the inductor current will begin to drop in the direct pass mode from time $T_1$ to time $T_2$. At time $T_2$, the sensed inductor current ISEN 602 reaches the first lower window voltage COMP_A and the buck-boost converter enters the direct pass mode of operation. With the buck-boost converter in the direct pass switching mode of operation, no switching operations occur, and the inductor current will continue dropping as represented by the ISEN value from time $T_2$ through time $T_3$. At time $T_3$, the sensed inductor current ISEN 602 drops below the second lower window voltage COMP_B and the buck-boost converter will cause the PWMB signal to go to a logical "high" level and enter the charging mode of operation. In the charging mode both the PWMA and PWMB control signals are at a logical "high" level causing transistor 120 to be turned "off" and transistor 122 to be turned "on" and ISEN 602 to begin increasing. After time $T_3$, the process repeats as described herein above. The sensed inductor current ISEN 602 is controlled within the window voltages COMP_B and COMP_B1.

Figure 7:
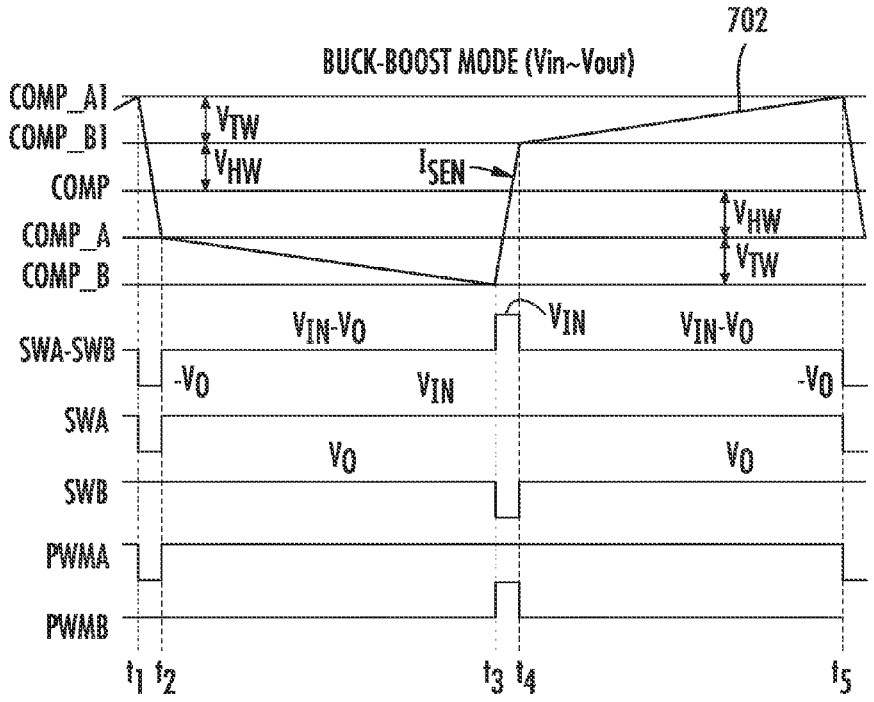
FIG. 7 is a timing diagram illustrating operation of the buck-boost converter in buck-boost mode of operation.

Referring now to FIG. 7, there is illustrated the operation of the buck-boost converter in buck-boost mode of operation when the input voltage $V_{IN}$ is substantially equal to the output voltage $V_{OUT}$. When the sensed inductor current signal ISEN 702 stays within the window of voltages defined by (COMP_B1, COMP_A1, COMP_A and COMP_B), the buck-boost converter runs in the direct pass mode of operation without any switching operations. When the inductor current drops below the value of COMP-$V_{TW}$(COMP_B), the node SWB 116 is coupled to ground to increase the current through the inductor 114. When the inductor current becomes greater than COMP+$V_{TW}$(COMP_A1), the SWA node 106 is coupled to ground to lower the current. Hysteretic current mode control automatically determines whether to operate in the buck or boost modes.

Before time $T_1$, the buck-boost converter 100 runs in the direct pass mode with PWMA at a logical "high" level and PWMB at a logical "low" level. The input voltage and the output voltage are applied to the inductor in this mode of operation. Since the input voltage is very close to the output voltage, (assume that $V_{IN}$ is slightly higher than $V_{OUT}$) the inductor current will increase slowly. In the case where $V_{OUT}$ was slightly higher than $V_{IN}$, the inductor current will slightly decrease.

At time $T_1$, the sensed inductor current ISEN 702 reaches the second upper voltage window COMP_A1 and triggers the discharge pass mode wherein PWMA and PWMB are both at logical "low" levels turning off transistors 104 and 108. The voltage across the inductor 114 is the output voltage so the inductor current will begin to drop from time $T_1$ to time $T_2$.

At time $T_2$, the sensed inductor current ISEN 702 drops below the first lower window voltage COMP_A. This will cause the PWMA control signal to go to a logical "high" level and puts the buck-boost converter 100 in the direct pass mode of operation with PWMA equal to logical "1" and the PWMB control signal equal to logical "0." This will cause transistor 108 to turn "off" and transistor 104 to turn "on." The voltage across the inductor 114 in the direct pass mode state is the difference between the input voltage and the output voltage. Assuming that the output voltage $V_{OUT}$ is a little higher than the input voltage $V_{IN}$, the inductor current will then begin to drop slowly from time $T_2$ to time $T_3$.

At time $T_3$, the sensed inductor current ISEN 702 drops below the second output window voltage COMP_B. The control circuit will pull the PWMB signal to a logical "high" level and the buck-boost converter will enter the charging mode of operation with PWMA at a logical "high" level and PWMB at a logical "high" level. This occurs by transistor 120 being turned "on" and transistor 122 being turned "off" In the charging mode, the input voltage is applied to the inductor 114 causing the inductor current to increase rapidly from time $T_3$ to time $T_4$.

At time $T_4$, the sensed inductor current $I_{SEN}$ 702 reaches the first upper current window voltage COMP_B1. This causes the PWMB signal to go to a logical "low" level and the buck-boost converter 100 enters the direct pass mode of operation with PWMA at a logical "high" level and PWMB at a logical "low" level. This causes transistor 122 to be turned "off" and transistor 120 to be turned "on." In the direct pass mode of operation, the voltage across the inductor 114 will be the difference between the input voltage and the output voltage. Assuming that the output voltage is a little lower than the input voltage, the inductor current will slowly increase from time $T_4$ to time $T_5$. The above process will then repeat as the sensed inductor current 702 is controlled within the window voltages COMP_A1, COMP_B1, COMP_A and COMP_B.

As can be seen from the above description, the window voltage determines the actual switching frequency within the hysteretic current mode control system described herein above. There are several techniques to define the window voltage. One technique is to use a constant window voltage to maintain the same inductor current ripple in different modes of operation. This technique can automatically reduce the switching frequency when the input voltage is close to the output voltage. Another technique is to keep the switching frequency almost constant in different operational modes. With this technique, the window voltage $V_{HW}$ is adjusted based upon the input voltage $V_{IN}$ and the output voltage $V_{OUT}$ since the inductor current ripple stays within the window voltage.

When the input voltage is close to the output voltage, the inductor current ripple may be very low for a constant switching frequency ($F_{SW}$) operation. In some applications, without a constant switching frequency requirement, it is preferred to reduce the switching frequency in this condition. Therefore, two schemes may be combined to achieve the optimal performance. Thus, when the input voltage is substantially different from the output voltage, the switching frequency is fixed for easy LC filter design. When the input voltage is relatively close to the output voltage, the constant ripple control is adopted to reduce the switching frequency $F_{SW}$.

In buck mode, the inductor current ripple can be calculated by the following equation.

$$I_{ripple_Buck} = \frac{V_{in} - V_o}{V_{in} L_o F_{sw}} V_o = \frac{V_{in} - V_o}{L_o F_{sw}} D_{PWMA}$$

In the boost mode of operation, the inductor current ripple is provided by:

$$I_{ripple_Boost} = \frac{V_o - V_{in}}{V_o L_o F_{sw}} V_{in} = \frac{V_o - V_{in}}{L_o F_{sw}} (1 - D_{PWMB})$$

Based upon the above equations, the window voltages is determined by the switching frequency $F_{SW}$, output inductance $L_O$, the PWM duty cycle, and the difference between $V_{IN}$ and $V_O$. When $F_{SW}$ and $L_O$ are relatively constant, the window voltage may be generated according to the duty cycle and difference between $V_{IN}$ and $V_O$.

Figure 8:
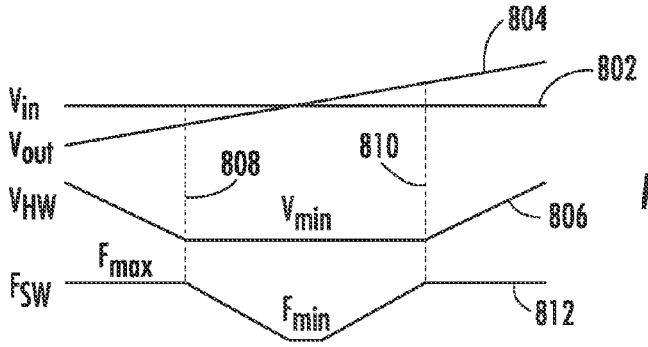
FIG. 8 illustrates the manner in which the switching frequency $F_{SW}$ and voltage window $V_{HW}$ are altered based upon the differences between the input voltage $V_{IN}$ and output voltage $V_{OUT}$.

When the input voltage is close to the output voltage, a constant window voltage can be chosen for constant inductor current ripple operation which will dynamically adjust the actual switching frequency. For example, as shown in FIG. 8, when the input voltage $V_{IN}$ 802 is close to the output voltage $V_{OUT}$ 804, the hysteresis threshold window $V_{HW}$ 806 is reduced and becomes constant from point 808 to point 810. From point 808 to 810 the switching frequency $F_{SW}$ drops from level Fmax to Fmin. Since the window voltage generated by the constant switching frequency control is larger than that with constant ripple control, the window voltage for the hysteretic control may be the maximum voltage selected from among the window voltages $V_{HWA}$ and $V_{HWB}$, generated by the circuit illustrated in FIG. 9. The window voltage $V_{HWA}$ is for buck mode of operation when the input voltage is above the output voltage. The window voltage $V_{HWB}$ is for the boost mode of operation when the input voltage is lower than the output voltage. The Vmin voltage source 902 defines the minimum window voltage for the constant ripple operation.

Figure 9:
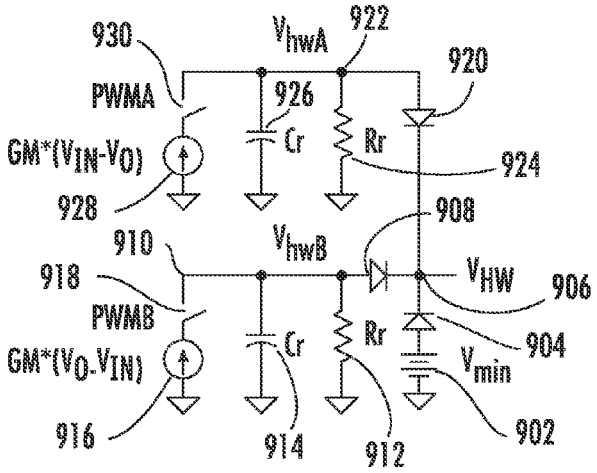
FIG. 9 illustrates a circuit for generating the voltage $V_{HW}$.

The circuit of FIG. 9 more particularly includes a diode 904 connected between the output $V_{HW}$ voltage node 906 and the Vmin voltage source 902. A diode 908 is connected between node 906 and node 910. A resistor 912 is connected between node 910 and ground. A capacitor 914 is in parallel with resistor 912 between node 910 and ground. A voltage source 916 in series with a switch 918 is connected between node 910 and ground. The voltage source equals $G_M \times (V_{OUT} - V_{IN})$ and the switch 918 is opened and closed responsive to the PWMB control signal. A diode 920 is connected between node 906 and node 922. Resistor 924 is connected between node 922 and ground. Capacitor 926 is connected between node 922 and ground. The series connection of voltage source 928 and switch 930 are also connected between node 922 and ground. The voltage source$=G_M \times (V_{IN} - V_O)$, the switch is under the control of the PWMA control signal.

Figure 10:
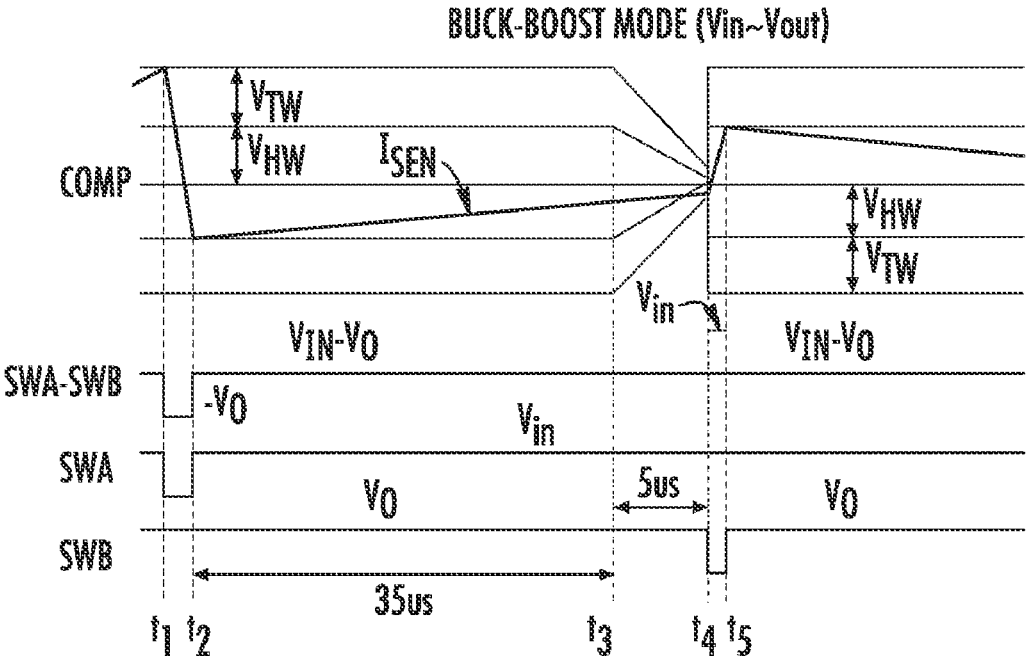
FIG. 10 illustrates the manner in which the voltage windows are adjusted responsive to changes in the switching frequency.

To avoid audible noise, the minimum switching frequency should remain greater than, for example, 25 kHz. Once simple way to achieve this is to reduce the window voltage when no switching operation occurs for some time. As illustrated in FIG. 10, after waiting for a period of 35 microseconds between time $T_2$ and $T_3$, the window voltage is gradually reduced to zero within 5 microseconds between time $T_1$ and $T_4$. Once a switching operation is triggered, the window voltage is reset to its original value at time $T_4$ or a smaller value, thus guaranteeing a one switching operation within 40 microseconds.

Figure 11:
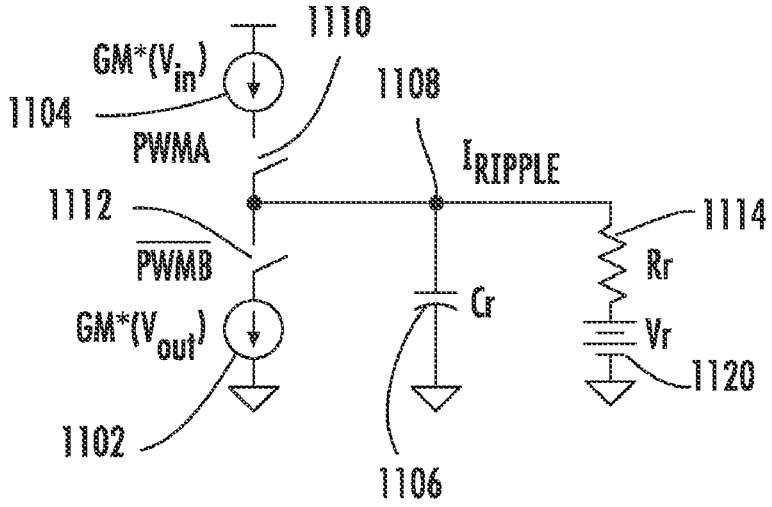
FIG. 11 is a circuit for generating the synthesized ripple current signal $I_{RIPPLE}$ for the PWM modulator.

One challenge in a buck-boost converter is sensing the inductor current with good accuracy and low noise. In accordance with one embodiment, a synthesized ripple signal is built to emulate the inductor ripple current as shown in FIG. 11. The input voltage and output voltage controls two current sources 1102 and 1104 which charge or discharge capacitor 1106 connected between node 1108 and ground. According to two PWM control signals, PWMA applied to switch 1110 and $\overline{\text{PWMB}}$ applied to switch 1112. The resistor [R] *Rr* 1114 is used to eliminate the DC component of the voltage signal applied by voltage source [$V_R$] *Vr* 1120. The current through capacitor 1106, $I_{RIPPLE}$ has a similar ripple wave form as the inductor current. With the synthesized ripple signal, the hysteretic current mode control may be implemented without the actual inductor current information.

It will be appreciated by those skilled in the art having the benefit of this disclosure that this hysteretic controlled buck-boost converter provides an improved operation with less switching losses. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An apparatus, comprising:

a buck boost converter for generating a regulated output voltage responsive to an input voltage, the buck boost converter including an inductor, a first pair of switching transistors responsive to a first PWM signal and a second pair of switching transistors responsive to a second PWM signal;

an error amplifier for generating an error voltage responsive to the regulated output voltage;

a control circuit for generating *a plurality of window voltages responsive to the error voltage, and for generating* the first PWM signal and the second PWM signal responsive to the [error voltage] *plurality of window voltages* and a sensed current voltage responsive to a sensed current through the inductor; and wherein the control circuit controls switching of the first pair of switching transistors and the second pair of switching transistors using the first PWM signal and the second PWM signal responsive to the sensed current through the inductor and [a] *the* plurality of [offset error] *window* voltages based on the error voltage.

2. The apparatus of claim 1, wherein the control circuit further comprises:

summation circuitry for generating the plurality of [offset error] *window* voltages responsive to the error voltage and a first offset voltage and a second offset voltage; and voltage mode control circuitry for generating the first PWM signal and the second PWM signal responsive to *a* comparison of the sensed current voltage with each of the plurality of [offset error] *window* voltages.

3. The apparatus of claim 2, wherein the voltage mode control circuitry further comprises:

a plurality of comparators, each of the comparators comparing the sensed current voltage with one of the plurality of [offset error] *window* voltages to generate a voltage control signal;

a first latch circuit connected to receive a first pair of the voltage control signals and generate the first PWM signal responsive thereto; and a second latch circuit connected to receive a second pair of the voltage control signals and generate the second PWM signal responsive thereto.

4. The apparatus of claim 2, wherein in a buck mode of operation the first PWM signal alternately turns on and off each of the first pair of switching transistors responsive to the sensed current voltage either exceeding a first of the plurality of [offset error] *window* voltages or falling below a second of the plurality of [offset error] *window* voltages and the second PWM signal keeps turned off the one of the second pair of switching transistors and keeps turned on the other of the second pair of switching transistors.

5. The apparatus of claim 2, wherein in a boost mode of operation the second PWM signal alternately turns on and off each of the second pair of switching transistors responsive to the sensed current voltage either exceeding a third of the plurality of [offset error] *window* voltages or falling below a fourth of the plurality of [offset error] *window* voltages and the first PWM signal keeps turned off one of the first pair of switching transistors and keeps turned on the other of the first pair of switching transistors.

6. The apparatus of claim 2, wherein in a buck-boost mode of operation the first PWM signal alternatively turns on and off each of the first pair of switching transistors responsive to the sensed current voltage either exceeding the first of the plurality of [offset error] *window* voltages or falling below the second of the plurality of [offset error] *window* voltages while the second PWM signal alternatively turns on and off each of the second pair of switching transistors responsive to the sensed current voltage either exceeding the third of the plurality of [offset error] *window* voltages or falling below the fourth of the plurality of [offset error] *window* voltages.

7. A control circuit for controlling switching of a buck boost converter, *the control circuit* comprising:

a first input for receiving a sensed current voltage responsive to a sensed current through an inductor of a buck boost converter;

a second input for receiving an error voltage from an error amplifier;

a pair of outputs for providing a first PWM signal and a second PWM signal;

a PWM control circuit for generating the first PWM signal and the second PWM signal responsive to the error voltage and a sensed current voltage responsive to a sensed current through the inductor; and wherein the control circuit controls switching of [the]*a* first pair of switching transistors and [the]*a* second pair of switching transistors using the first PWM signal and the second PWM signal responsive to the sensed current through the inductor and a plurality of [offset error] *window* voltages based on the error voltage.

8. The control circuit of claim 7, wherein the control circuit further comprises:

summation circuitry for generating the plurality of [offset error] *window* voltages responsive to the error voltage and a first offset voltage and a second offset voltage; and a hysteretic voltage mode control circuitry for generating the first PWM signal and the second PWM signal responsive to comparison of the sensed current voltage with each of the plurality of [offset error] *window* voltages.

9. The control circuit of claim 8, wherein the hysteretic voltage mode control circuitry further comprises:

a plurality of comparators, each *pair* of the *plurality of* comparators comparing the sensed current voltage with one of the plurality of [offset error] *window* voltages to generate a voltage control signal;

a first latch circuit connected to receive a first pair of the voltage control signals and generate the first PWM signal responsive thereto; and a second latch circuit connected to receive a second pair of the voltage control signals and generate the second PWM signal responsive thereto.

10. The control circuit of claim 8, wherein in a buck mode of operation the first PWM signal alternately turns on and off each of the first pair of switching transistors responsive to the sensed current voltage either exceeding a first of the plurality of [offset error] *window* voltages or falling below a second of the plurality of [offset error] *window* voltages and the second PWM signal keeps turned off the one of the second pair of switching transistors and keeps turned on the other of the second pair of switching transistors.

11. The control circuit of claim 8, wherein in a boost mode of operation the second PWM signal alternately turns on and off each of the second pair of switching transistors responsive to the sensed current voltage either exceeding a third of the plurality of [offset error] *window* voltages or falling below a fourth of the plurality of [offset error] *window* voltages and the first PWM signal keeps turned off one of the first pair of switching transistors and keeps turned on the other of the first pair of switching transistors.

[12. The control circuit of claim 8, wherein in a boost mode of operation the second PWM signal alternately turns on and off each of the second pair of switching transistors responsive to the sensed current voltage either exceeding a third of the plurality of offset error voltages or falling below a fourth of the plurality of offset error voltages and the first PWM signal keeps turned off one of the first pair of switching transistors and keeps turned on the other of the first pair of switching transistors.]

13. A method for controlling operations of a buck boost converter, comprising the steps of:

generating a regulated output voltage responsive to an input voltage;

generating an error voltage responsive to the regulated output voltage and a reference voltage;

generating a first PWM signal and a second PWM signal responsive to a sensed current through an inductor and a plurality of [offset error] *window* voltages based on the error voltage; and switching of a first pair of switching transistors and a second pair of switching transistors using the first PWM signal and the second PWM signal.

14. The method of claim 13, wherein the step of generating the first PWM signal and the second PWM signal further comprises the steps of:

generating the plurality of [offset error] *window* voltages responsive to the error voltage and a first offset voltage and a second offset voltage; and comparing [the]*a* sensed current voltage with each of the plurality of [offset error] *window* [voltage]*voltages* to generate the first PWM signal and the second PWM signal.

15. The method of claim 14, further including the step of:

generating the first PWM signal responsive to a first pair of voltage control signals from the step of comparing; and generating the second PWM signal responsive to a second pair of voltage control signals from the step of comparing.

16. The method of claim 13, wherein the step of generating the first PWM signal and the second PWM signal further comprises the step of generating the first PWM signal and the second PWM signal in a buck mode of operation, further comprising the steps of:

alternately turning on and off each of the first pair of switching transistors responsive to the sensed current voltage either exceeding a first of the plurality of [offset error] *window* voltages or falling below a second of the plurality of [offset error] *window* voltages;

keeping turned off the one of the second pair of switching transistors; and keeping turned on an other of the second pair of switching transistors[. turning off the second pair of switching transistors].

17. The method of claim 13, wherein the step of generating the first PWM signal and the second PWM signal further comprises the step of generating the first PWM signal and the second PWM signal in a boost mode of operation, further comprising the steps of:

alternately turning on and off each of the second pair of switching transistors responsive to the sensed current voltage either exceeding a third of the plurality of [offset error] *window* voltages or falling below a fourth of the plurality of [offset error] *window* voltages;

keeping turned off one of the first pair of switching transistors; and keeping turned on another of the first pair of switching transistors[, turning off the first pair of switching transistors].

18. The method of claim 13, wherein the step of generating the first PWM signal and the second PWM signal further comprises the step of generating the first PWM signal and the second PWM signal in a buck-boost mode of operation, further comprising the steps of:

alternately turning on and off each of the first pair of switching transistors responsive to the sensed current voltage either exceeding a first of the plurality of [offset error] *window* voltages or falling below a second of the plurality of [offset error] *window* voltages; and alternately turning on and off each of the second pair of switching transistors responsive to the sensed current voltage either exceeding a third of the plurality of [offset error] *window* voltages or falling below a fourth of the plurality of [offset error] *window* voltages.

*19. A method for controlling operations of a buck-boost converter, comprising:*

*receiving a sensed current voltage responsive to a current through an inductor of the buck-boost converter;*

*determining if the sensed current voltage is above or below a predefined window voltage;*

*if the sensed current voltage is below the predefined window voltage, determining if the sensed current voltage is substantially equal to a zero voltage;*

*if the sensed current voltage is below the predefined window voltage and substantially equal to the zero voltage, switching the buck-boost converter to a first mode of operation; and*

*if the sensed current voltage is below the predefined window voltage and not substantially equal to the zero voltage, switching the buck-boost converter to a second mode of operation.*

*20. The method of claim 19, further comprising:*

*responsive to the determining if the sensed current voltage is above or below the predefined window voltage, if the sensed current voltage is above the predefined window voltage, switching the buck-boost converter to the second mode of operation.*

*21. The method of claim 19, further comprising:*

*if the buck-boost converter is in the second mode of operation, and the sensed current voltage is below the predefined window voltage, determining if an increase in the sensed current voltage occurred in response to the switching the buck-boost converter to the second mode of operation; and*

*if the increase in the sensed current voltage did not occur in response to the switching the buck-boost converter to the second mode of operation, switching the buck-boost converter to a third mode of operation.*

*22. The method of claim 20, further comprising:*

*if the buck-boost converter is in the second mode of operation, and the sensed current voltage is above the predefined window voltage, determining if a decrease in the sensed current voltage occurred in response to the switching the buck-boost converter to the second mode of operation; and*

*if the decrease in the sensed current voltage did not occur in response to the switching the buck-boost converter to the second mode of operation, switching the buck-boost converter to a fourth mode of operation.*

*23. The method of claim 21, further comprising:*

*if the buck-boost converter is in the third mode of operation, determining if an output voltage of the buck-boost converter is decreased to a predefined threshold level;*

*if the output voltage is decreased to the predefined threshold level, switching the buck-boost converter to a fifth mode of operation; and*

*if the output voltage is not decreased to the predefined threshold level, switching the buck-boost converter to the second mode of operation.*

*24. The method of claim 22, further comprising:*

*if the decrease in the sensed current voltage occurred in response to the switching the buck-boost converter to the second mode of operation, determining if an output voltage of the buck-boost converter is decreased to a predefined threshold level;*

*if the output voltage is decreased to the predefined threshold level, switching the buck-boost converter to a fifth mode of operation; and*

*if the output voltage is not decreased to the predefined threshold level, switching the buck-boost converter to the second mode of operation.*

*25. The method of claim 21, further comprising:*

*if the increase in the sensed current voltage occurred in response to the switching the buck-boost converter to the second mode of operation, determining if an output voltage of the buck-boost converter is decreased to a predefined threshold level;*

*if the output voltage is decreased to the predefined threshold level, switching the buck-boost converter to a fifth mode of operation; and*

*if the output voltage is not decreased to the predefined threshold level, switching the buck-boost converter to the second mode of operation.*

*26. The method of claim 19, wherein the first mode of operation is a diode emulation mode, and the second mode of operation is a direct pass mode.*

*27. The method of claim 21, wherein the third mode of operation comprises a charging mode.*

*28. The method of claim 22, wherein the fourth mode of operation comprises a discharge mode.*

*29. The method of claim 23, wherein the fifth mode of operation comprises a free-wheeling mode.*

* * * * *